Aug. 13, 1968  A. SCHUMAN  3,396,713
CONCRETE SAW GUIDE AND METHOD OF USE THEREOF
Filed Aug. 1, 1966  2 Sheets-Sheet 2
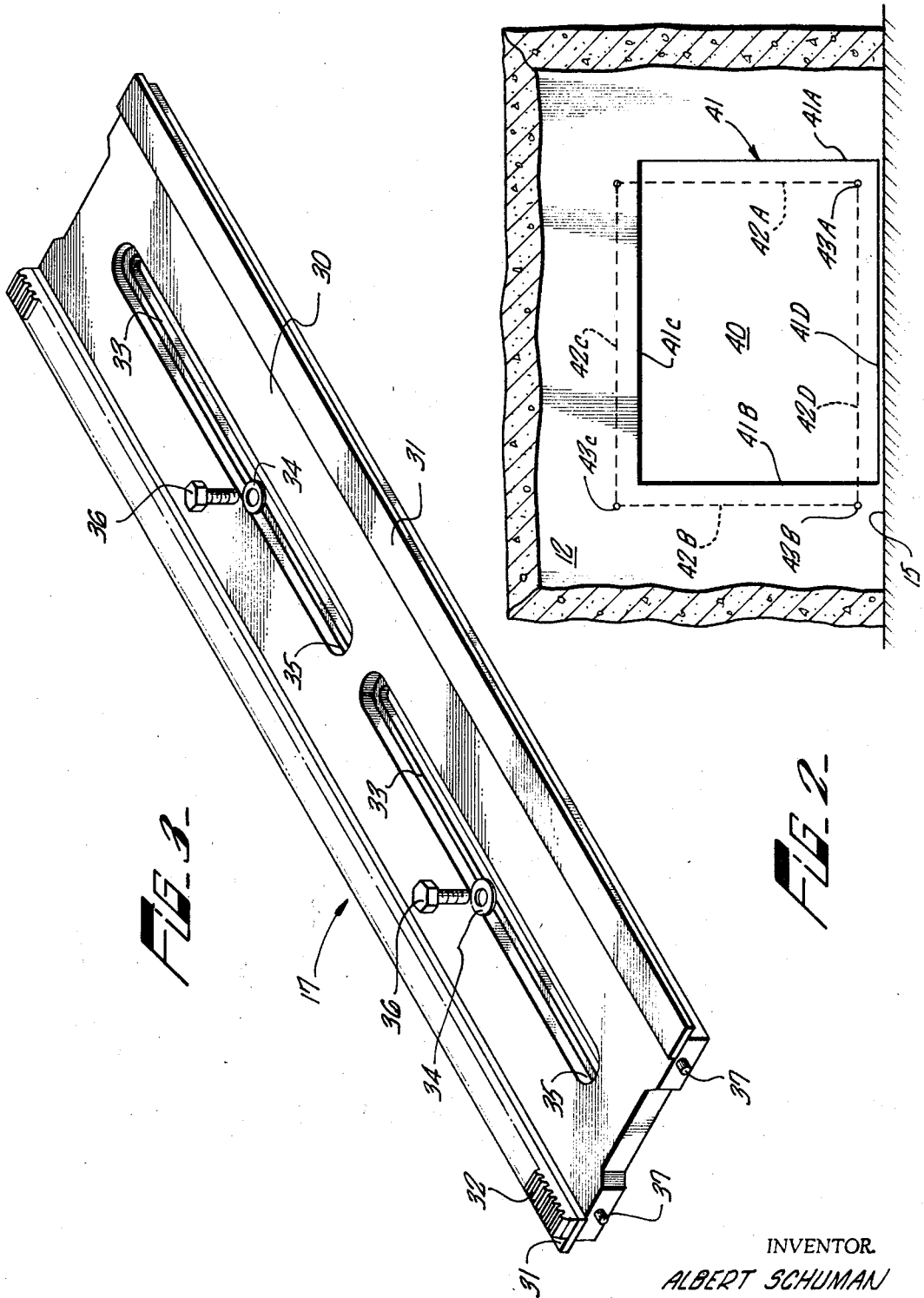
INVENTOR.
ALBERT SCHUMAN
BY
Christie, Parker & Hale
ATTORNEYS.

United States Patent Office 3,396,713
Patented Aug. 13, 1968

3,396,713
CONCRETE SAW GUIDE AND METHOD OF
USE THEREOF
Albert Schuman, 19223 Alisal, Covina, Calif. 91722
Filed Aug. 1, 1966, Ser. No. 569,232
8 Claims. (Cl. 125—14)

This invention pertains to a guide system for a travelling concrete wall saw and the like, and to a novel and efficient method for cutting doorways and the like in concrete and masonry walls.

In the remodeling of concrete or masonry structures, it is often desired that a door or window opening be provided where no opening previously existed. Since the formation of such openings by the use of a sledge hammer or a power driven hammer is a time consuming and costly procedure, especially where the opening is to be formed in a reinforced wall, and further since hammer-formed openings are usually not neat in final appearance, an industry has developed for forming such openings by motor-driven circular saws having diamond-impregnated peripheries. Such saws cut a neat opening in the desired wall.

The saw blades of concrete saws are relatively thin and rotate at relatively high rates. Accordingly, only in exceptional cases can such saws be hand-held or hand-guided; the slightest movement in the support of the saw as it traverses a concrete surface can easily result in permanent damage to the expensive saw blade, and such movement also causes the actual cut line to deviate from the desired cut line. Concrete saws normally are heavy pieces of equipment. As a result, particularly where the saw is used to produce a cut in a non-horizontal surface, it is standard practice to mount the saw to a guide structure which is secured or fixed relative to the surface to be cut. The saw is then moved along the guide structure in straight line movement.

In cutting a door or window opening, it is apparent that at least three, and normally four, straight cuts must be made. The saw guide structures previously used, however, permit only limited travel of the saw. Therefore, where a long cut is to be made, the entire guide structure must be moved bodily along the line of the cut in step-by-step increments; this is a time consuming and often strenuous procedure because, where a wall is being cut, the guide structure must be bolted to the wall. Also, the guide structure must be moved bodily when it is desired that the cut direction be changed. Depending upon the nature of the guide structure, it may or may not be necessary to remove the saw from the guide structure each time the guide structure is moved on the wall. It is apparent, therefore, that the concrete wall saw structures used prior to this invention involved time consuming, cumbersome and costly procedures where such structures were used to form door or window openings in a wall and the like.

This invention provides a novel, effective, efficient and simple wall saw guide structure which permits the saw to be moved along a line of any length desired, and the guide structure need not be entirely removed from a wall where it is desired that a cut change direction, as at the corners of a door or window opening. Further, the saw itself need not be removed from the guide structure when the guide structure is moved. The invention also provides a novel and efficient method for handling a concrete saw during the process of cutting a door or window opening in a wall and the like.

Generally speaking, this invention provides a guide structure for a rotary disc concrete saw and the like. The guide structure includes an elongate base which is adapted to be mounted to a masonry wall and the like. Guide means are carried by the base and extend linearly along the base for receiving a concrete saw assembly and for guiding a received saw assembly along a straight line. Saw assembly traction means are also carried by the base for cooperation with a received saw assembly in driving the received saw assembly along the straight line. The guide structure also includes means for mounting the post to a wall and the like in alignment with a desired cut line. The mounting means includes slot aperture means through the base, the slot aperture means being provided in elongate alignment with the straight line associated with the guide means.

The above-mentioned and other features of the present invention are more fully set forth in the following detailed description of a presently preferred embodiment of the invention, the description being presented with reference to the accompanying drawings, wherein:

FIG. 2 is a diagrammatic elevation view of another wall sawing installation; and FIG. 3 is a perspective view of a concrete saw guide structure according to this invention.

Figure 1:
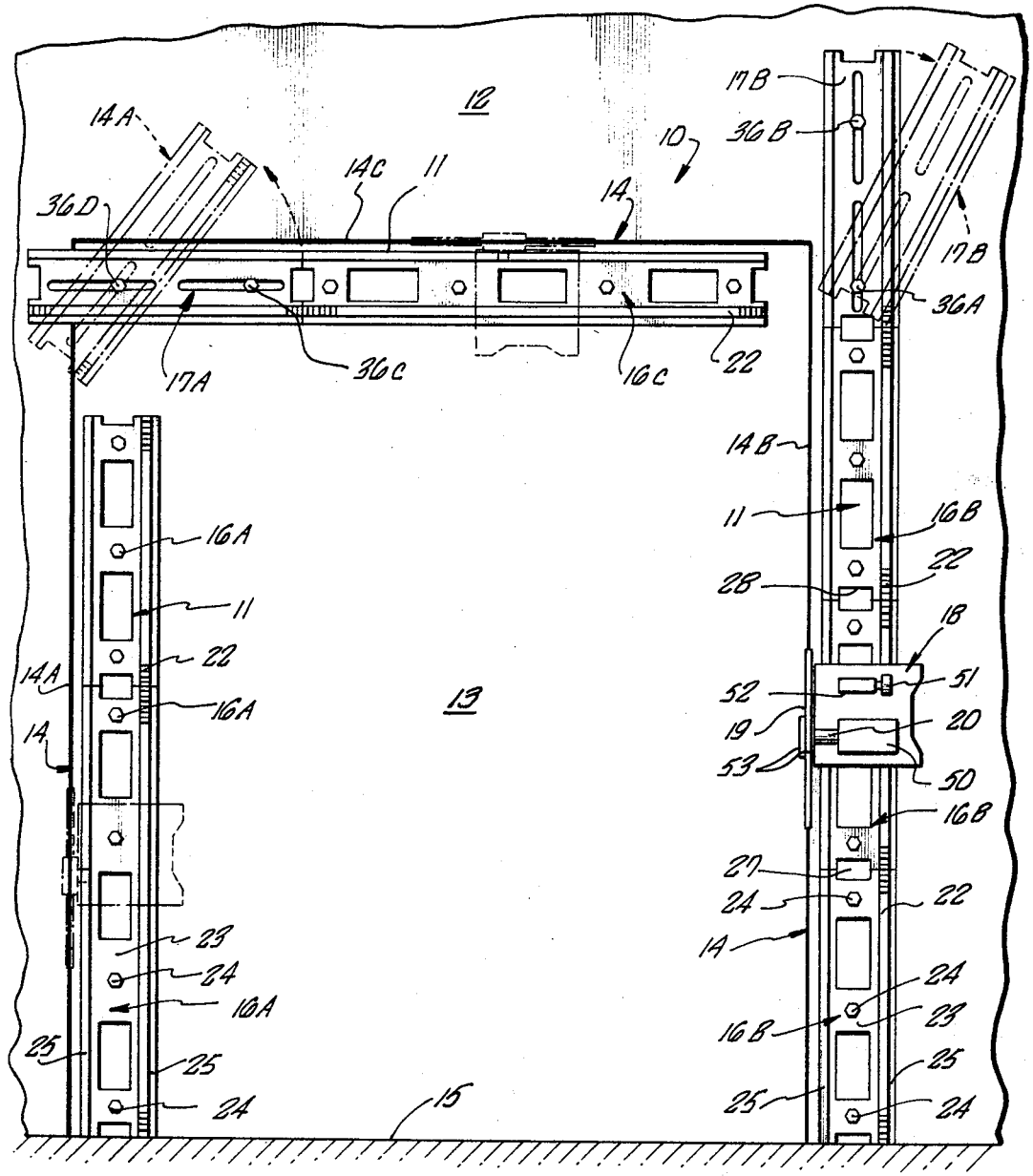
FIG. 1 is a side elevational view of a concrete wall sawing installation in accord with this invention.

As shown in FIG. 1, a wall sawing installation 10 includes a guide system 11 for a saw assembly 18, the guide system being secured to an exposed surface of concrete or masonry wall 12 in and around the area of a door opening 13 to be provided in the wall. The door opening is defined by a saw cut line 14 having left and right vertical segments 14A and 14B and a horizontal segment 14C. The lower extent of the door opening is coextensive with a horizontal foundation surface 15.

The guide system is composed of a plurality of saw track units 16 and a pair of swinging junction track elements 17. Track units 16 are arranged in groups of units 16A, 16B and 16C located, respectively, parallelly adjacent to the corresponding segments of cut line 14. Track elements 17 include track element 17A adjacent the intersection of cut line segments 14A and 14C, and track element 17B adjacent the intersection of cut line segments 14B and 14C. A concrete saw assembly 18, including a rotary saw disc 19 having a diamond-impregnated periphery, is mounted to system 11 for movement therealong. The guide system is arranged on the wall surface so that saw blade 19 rotates in a plane in which the adjacent segment of cut line 14 also lies.

Track units 16 and wall saw assembly 18 preferably are in accord with the disclosures of my copending application Ser. No. 411,462, filed Nov. 16, 1964, now Patent No. 3,323,507, for Concrete Cutting Machine. Briefly, however, the saw assembly includes a motor 50 operatively connected to a shaft 20 to which the saw blade 19 is secured, the motor being operable for rotating the saw blade. The saw assembly also includes a mechanism for raising and lowering the saw blade toward and away from a all surface and the like in the plane of rotation of the saw blade. Further, the saw assembly includes a mechanism for driving the saw assembly along a guide track with which the assembly is mounted; preferably the drive mechanism includes a pinion gear 51 which is meshed with a rack 22 carried by each component of the saw assembly guide system and driven by a motor 52.

Each track unit 16 includes an elongate, rigid, rectangularly configured base plate 23 which is adapted to be secured directly to wall 12 by a plurality of bolts 24. Along its opposite elongated edges, each base plate 23 carries a straight guide rail 25, the guide rails being arranged in parallel alignment with each other. The rack of each track unit is secured to the base plate adjacent one of the guide rails. Each of units 16 is substantially identical, except for permissible and often desired variations in length, in that the racks thereof are disposed adjacent corresponding rails. One end of each track unit 16 carries a tongue member 27 mated in a corresponding recess 28 in the opposite end of an adjacent track unit of system 11.

As shown in FIG. 1, track units 16 are bolted directly to wall 12 parallel to the adjacent corresponding segments of cut line 14; the track units are mounted so that their racks are on the far sides of the track units from the cut line. The track units are so mounted to the wall that when saw assembly 18 is engaged with a given one of the track units, the saw blade lies in a plane which includes the cut line. The tongue member and recess of adjacent track units cooperate to align the guide rails and racks of abutted track units with each other. Accordingly, the saw assembly, which carries a plurality of roller assemblies (not shown) engaged with the guide rails 25, can move easily from track unit to track unit along a straight line in response to rotation of pinion 51 which is engaged with rack 22. The extent of the straight line along which the saw assembly is movable is limited only by the number of track units which are secured in end-to-end relation to wall 12.

With reference to segment 14B of cut line 14, in accord with this invention track units 16B preferably are installed on the wall to the right of this segment. The group of track units 16B extend from foundation surface 15 to a point short of the intersection of the cut line segments 14B and 14C. A single track unit 16C is secured to wall surface 12 below and parallel to cut line segment 14C in such a manner that the unit has its right-handmost extremity spaced to the left of cut line segment 14B and has its left-handmost end spaced to the right of cut line segment 14A. It is obvious, owever, that a number of track units 16C may be provided across the top of the doorway, the number of track units to be used depending upon the transverse dimension of the door opening. A plurality of track units 16A are secured to wall surface 12 in a verical arrangement to the left of cut line segment 14A and extend from surface 15 to short of cut line segment 14C.

The above-described arrangement of track units 16 preferably is secured to wall surface 12 before the wall sawing operation is commenced, at least one of these units being secured to the wall with saw assembly 18 received on the guide rails thereof. Also, preferably prior to commencement of the wall sawing operation, a pair of swinging junction track elements 17 are secured to the wall, as shown in solid lines in FIG. 1, at the upper end of the line of track units 16B and at the left end of the line of track units 16C. It will be apparent to those skilled in the art, however, that the above preferred preliminary installation procedure may be varied so as to be preformed progressively as the wall sawing operation is carried out; this alternate procedure is particularly useful where an insufficient number of track units 16 are available to enable complete pre-erection of system 11.

Track elements 17 are new structural arrangements provided by this invention. As illustrated in FIG. 3, each track element 17 is generally similar to track units 16 in that each element 17 includes an elongate, relatively massive, rigid base plate 30. A straight guide rail 31 is secured to the base plate along each long edge of the plate so as to overhang the adjacent edge of the plate; the rails are parallel to each other and are spaced apart the same distance as the rails carried by a unit 16. An elongate rack 32 is secured to the top surface of one of the rails at a location spaced inwardly and parallel to the outer edge of one of the rails. As shown in FIG. 3, the rack extends from end to end of track element 17. A pair of elongate slot apertures 33 are formed through the central portion of the base plate. Preferably, as shown in FIG. 3, the apertures are aligned with each other along a line midway between rails 31, and their combined elongate extent occupies a major portion of the elongate extent of base plate 30. The slot apertures constitute a portion of means for securing the track element to wall surface 12. The track element mounting means further includes, with respect to each slot aperture, a washer 34 which is receivable in a shallow peripheral recess 35 around each slot aperture, and a bolt 36 which is sufficiently long to be passed through the washer, slot aperture and into a suitable socket secured in wall 12 at a predetermined location relative to cut line 14. A pair of positioning dowels 37 extend from each end of base plate 30 for engagement in cooperating recesses formed in each end of each track unit 16 so that, when a track element 17 is abutted with a track unit 16, the guide rails and racks of the abutted track sections are essentially continuous with each other.

As shown in FIG. 1, at the commencement of a wall sawing operation by which door opening 13 is to be formed, track element 17B is abutted against and aligned with the uppermost track unit 16B mounted to wall 12 to the right of door opening 13. The bolt (36A) passed through the lower slot aperture of this track element is positioned on a line lying midway between and parallel to the rails of track unit 16C so that, when this bolt is subsequently loosened relative to the wall and bolt 36B engaged in the upper slot aperture of the track element is removed, the track element can be slid vertically relative to adjacent track unit 16B to clear pins 37 from the recesses in adjacent track unit 16 and track element 17B can then be rotated about bolt 36A into a horizontal position and slid into mating abutting alignment with track unit 16C. Obviously, such pivotal change of position of track element 17B on the wall is accomplished after the cut along segment 14B of the cut line has been completed. Also, at the time track element 17B is pivoted, it carries the saw assembly, the saw disc being raised above the wall surface during the track swinging operation. Bolt 36A is then tightened down again into its socket, and bolt 36B is engaged through the other slot aperture of track element 17B along the centerline of track element 16C to again fixedly secure track element 17B to wall 12. The wall sawing installation is then in condition for resumption of the wall sawing operation to cut the top limit of door opening 13. The second stage of the wall sawing operation then continues until the saw assembly reaches the intersection of cut line segments 14A and 14C, at which time the saw assembly is received upon the other track element 17A. The rightmost bolt 36C through track element 17A is then removed from its socket in the wall and the track element is moved about loosened left-hand bolt 36D which is placed in the wall at a point along the centerline of track unit 16C and track units 16A. Track element 17A is then slid downwardly relative to bolt 36D into mating abutted engagement with the uppermost one of track units 16A. After bolt 36C has been transferred to and tightened in a corresponding pre-positioned socket in wall 12 located along the centerline of track units 16A, the wall sawing operation can be completed by cutting along cut line segment 14A.

The lower boundary of the door is not cut by saw assembly 18 in use of installation 10 because, in this case, it is desired that the lower edge of the door be in the plane of foundation surface 15. Saw disc 19 is held in place in the saw between a pair of clamping plates 53 which prevent the saw disc from being placed tangent to foundation surface 15. Accordingly, the masonry or concrete of which wall 12 is made is cracked by the application of an air hammer along surface 15 between the left and right limits of the door opening. Thereafter, it is a simple matter to connect a cable to the panel to be removed and pull it forwardly out of the door opening. If the wall is made of reinforced concrete, the reinforcing rods in the panel to be removed are merely bent over with the panel. It is then a simple matter to use a power saw and a pneumatic hammer to completely remove the panel from the wall and to trim the lower limit of the door opening.

FIG. 2 illustrates an alternate arrangement by which all four edges of a door opening 40 can be cut by the use of a power driven rotary disc concrete saw. The solid lines in FIG. 2 represent a cut line 41 having segments 41A, 41B, 41C and 41D, these cut lines corresponding to the side, top and bottom edges of the door opening. The bottom edge of the door opening substantially coincides with a foundation surface 15 to which the door opening is to extend. The dashed lines 42A, 42B, 42C and 42D in FIG. 2 represent the center lines of the track unit assemblies along which the wall saw moves in cutting the respective boundaries of the door opening. The circles 43A, 43B and 43C at the intersections of dashed lines 42A and 42D, 42D and 42B, and 42B and 42C, respectively represent the locations of the bolts 36 about which track elements 17 are swung in accomplishing a change of direction of the wall saw. Only three track elements 17 are required since the saw position on the wall need be changed only three times after the cut is commenced at the upper end of cut line segment 41A, for example. The material in the wall remaining between the foundation surface and the lower boundary of the door opening is removed by the use of a pneumatic hammer or the like, or by the use of a circularly cylindrical rotary concrete coring saw, as is within the state of the art.

From the foregoing, it is apparent that this invention provides method and apparatus for cutting openings in masonry walls and the like without removing a movable concrete saw assembly from the wall when it is necessary to change the direction of the cut made by the saw assembly. As noted, the saw assembly itself is normally quite heavy. Previously, it was necessary to remove the saw assembly and its supporting structure from the wall to accomplish a cut line change of direction. With the use of this invention, however, the cumbersome, time consuming and strenuous procedures previously inherent in wall sawing installations are no longer needed. As a result, concrete wall sawing operations can now be carried out more rapidly and efficiently.

Track elements 17 comprise movable guide structure units for a movable concrete wall saw. The specific movable guide structure units described above are particularly suited for use with a wall saw in accord with the above-mentioned copending application. It should be apparent, however, to persons skilled in the art to which this invention pertains, that the particular structure of the movable guide structure may be modified, without departing from the scope of this invention, to adapt the teachings and spirit of this invention to wall saws differing from the saw described in my copending application. Track element 17 has been selected for description merely for the purposes of example and illustration and should not be regarded as being the only form which structure according to the present invention may take. Accordingly, the foregoing description is not to be considered as limiting the scope of this invention.

What is claimed is:

1. A guide structure for a rotary disc concrete saw and the like comprising an elongate base adapted to be mounted to a masonry wall and the like, guide means extending linearly along the base for receiving a concrete saw assembly therealong and for guiding a received saw assembly along a straight line, saw assembly traction means carried by the base for cooperation with a received saw assembly in driving the received saw assembly along said line, and means for swingably mounting the base to a wall and the like in alignment with a desired cut line including slot aperture means through the base in elongate alignment substantially parallel to said straight line.

2. Apparatus according to claim 1 wherein the guide means comprises a pair of straight parallel rails.

3. Apparatus according to claim 2 wherein the slot aperture means comprises an elongate slot elongated in the direction of the elongate extent of the base, the slot being disposed substantially midway between and parallel to said rails.

4. Apparatus according to claim 3 wherein the slot aperture means comprises a pair of said slots aligned with each other.

5. Apparatus according to claim 1 wherein the traction means comprises a rack extending along the length of the base and oriented parallel to the straight line associated with the guide means.

6. Apparatus according to claim 1 including means for aligning the base in end abutment relation with another similar guide structure so that the guide and traction means of the abutted structures are linearly aligned and essentially continuous with each other.

7. A method for supporting and guiding a movable saw assembly around a corner during sawing an opening for a door and the like in a masonry wall and the like, the opening having first and second boundary segments intersecting each other at an angle, the method comprising the steps of (1) securing to the wall adjacent to and parallel to the first boundary segment and adjacent to but spaced from the intersection of said segment, with the saw assembly received thereon, a first guide unit arranged for receiving a saw assembly and for guiding a received saw assembly along a straight line defined by the unit and to another similar unit engaged in end abutment therewith, (2) securing a second guide unit similar to the first guide unit to the wall adjacent to and parallel to the second boundary segment and adjacent to but spaced from said intersection, (3) clamping a guide element, arranged for receiving and guiding a saw assembly along a straight line defined thereby and for receiving the assembly from a guide unit engaged in end abutment therewith, to the wall adjacent to the intersection in end abutment relation to the first guide unit in such relation to the intersection that the element extends past said intersection along the line of the first boundary segment, (4) engaging the saw assembly with the wall and moving the assembly along the first guide unit onto the guide element to cut said first boundary segment, (5) moving the guide element, with the saw assembly received thereon, from end abutment relation to the first guide unit into end abutment relation to the second guide unit, and securing the guide element to the wall in such relation, and (6) engaging the saw assembly with the wall and moving the assembly along the guide element onto the second guide unit to cut said second boundary segment.

8. The method according to claim 7 wherein the procedure of moving the guide element includes the steps of (1) relaxing the clamping engagement of the guide element, with the saw assembly received thereon, to the wall sufficiently to render the element movable relative to the wall but insufficiently to cause the element to separate from the wall, and (2) moving the partially clamped guide element into end abutment relation to the second guide unit.

References Cited

UNITED STATES PATENTS

| | | | |
|---|---|---|---|
| 1,485,101 | 2/1924 | Wegner | 125—14 |
| 2,488,643 | 11/1949 | Smith | 125—14 |
| 2,965,094 | 12/1960 | Carrier | 125—14 |

OTHELL M. SIMPSON, *Primary Examiner.*